(No Model.)

M. B. LLOYD.
WEIGHING SCALE.

No. 378,698. Patented Feb. 28, 1888.

Witnesses.
S. J. Beardsle
J. Jessen.

Inventor.
Marshall B. Lloyd.
By A. C. Paul, Atty

UNITED STATES PATENT OFFICE.

MARSHALL B. LLOYD, OF CAVALIER, ASSIGNOR OF ONE-FOURTH TO JOHN CONMEE, OF WALSH COUNTY, DAKOTA TERRITORY.

WEIGHING-SCALE.

SPECIFICATION forming part of Letters Patent No. 378,698, dated February 28, 1888.

Application filed October 17, 1887. Serial No. 252,541. (No model.)

*To all whom it may concern:*

Be it known that I, MARSHALL B. LLOYD, of Cavalier, in the county of Pembina and Territory of Dakota, have invented certain new and useful Improvements in Weighing-Scales, of which the following is a specification.

My invention relates to certain improvements in weighing-scales, and the object I have in view is to provide a scale which shall be simple in construction and less expensive than the ordinary scales and easily adapted to accurately weigh either light or heavy articles.

My invention is particularly adapted for use where a variety of articles have to be weighed, and where it is necessary at present to use two sizes, one for weighing heavy articles and one for light.

By my improvement I not only make a scale which is simpler and less expensive than the ordinary platform-scales, but one that is equally well adapted to be used in the place of scoop-scales.

My invention consists, generally, in the construction hereinafter described, and particularly pointed out in the claim.

Figure 1:
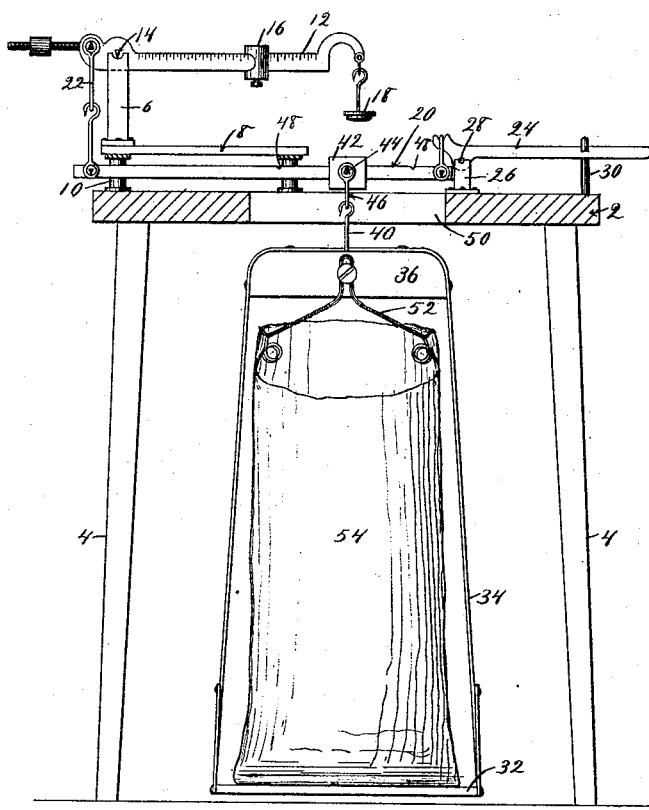
Figure 2:
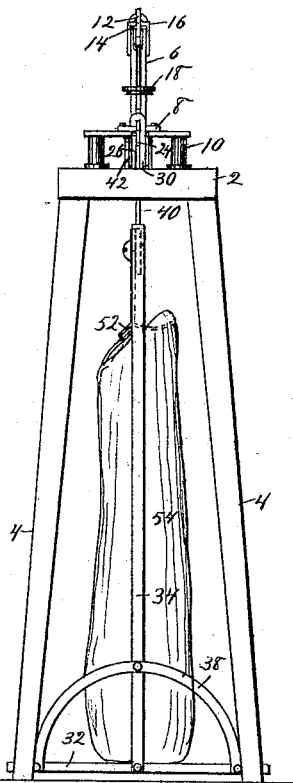
Figures 3, 5:
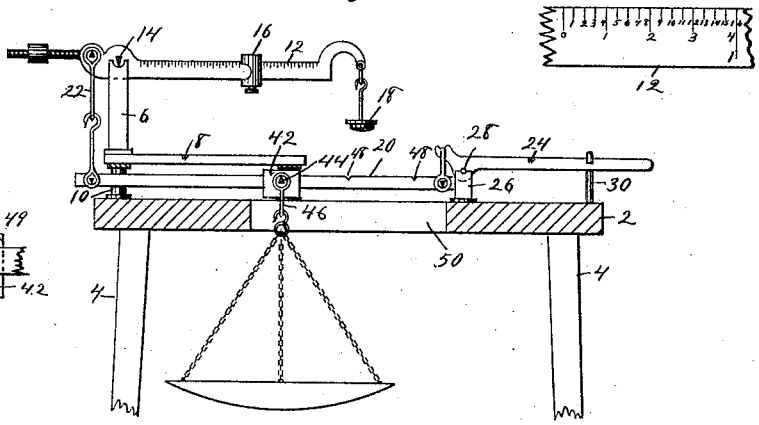
Figure 4:
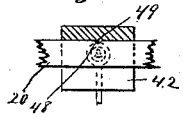

In the drawings which form a part of this specification, Figure 1 is a side elevation and partial section of a scale embodying my invention. Fig. 2 is an end elevation of the same. Fig. 3 is a side elevation similar to Fig. 1, but showing the scale adapted to weigh lighter articles. Fig. 4 is a detail section of the slide. Fig. 5 is a detail showing the graduations of the scale-beam.

In the drawings, 2 represents the bed-plate or support on which the weighing mechanism is located. This bed-plate is preferably provided with legs or supports 4, of any convenient height, to allow for the arrangement of the platform below the scale-beam.

6 represents a standard located at one end of the bed-plate, and preferably supported upon the plate 8, which is provided at the four corners with the thimbles 10, or other suitable supports by which it is secured to the said bed-plate.

12 represents a scale-beam supported on the fulcrum 14, which bears upon a support on the standard. This scale-beam may be provided with a poise, 16, and a plate, 18, for attaching extra weights in the ordinary manner.

20 is an auxiliary beam, preferably located beneath the plate and extending longitudinally between the supports 10. One end of this auxiliary beam is provided with suitable knife-edged fulcrum-pins, which are attached by rods or links 22 to similar knife-edged fulcrum-pins upon the beam 12. The other end of this beam is preferably supported by a suitable link and fulcrum-pins upon a movable lever, 24. This lever is secured to and rests upon a support, 26, by means of the pin or bearing 28, and is held in a horizontal position by a hook or catch, 30. The support 26 is fastened upon the bed-plate 2. The hook 30 is also secured to the bed-plate 2, but may be revolved, in order that the top or hooked portion may be turned to one side and allow the lever 24 to be raised.

32 represents a platform, at each side of which I prefer to attach a strap or band, 34. This band is centrally located on the opposite edges of the platform and extends upward and over the head-piece 36, to which it is firmly secured. A brace, 38, is attached to each side of the platform and to the strap 34 for the purpose of firmly holding said platform and preventing it from tilting as the weight is placed upon it. A hook, 40, is secured to the head-piece 36 for the purpose of suspending the platform.

42 represents a slide which travels on the auxiliary beam 20. This slide is preferably provided with knife-edged projections or fulcrum-pins 44 upon each side. Depending from these projections I place a clevis, 46. At intervals upon the beam 20 I prefer to place notches 48, and a corresponding projection, 49, is located within the slide 42, in order to retain the slide in its proper position upon said beam. The platform is attached to the slide 42 by uniting the hook 40 with the clevis 46. A slot or recess, 50, is formed in the bed-plate 2, of sufficient length to allow the slide 42 to be shoved back and forth upon the beam 20 and prevent the hook from coming in contact with the said bed-plate. A bag-holder, 52, may be located upon the head-piece 36 to support the upper portion of the bag for convenience in filling. The notches 48 on the beam may be of any required number, and the graduations on the scale-beam 12 are made to correspond with these notches. If the slide 42 be located in the right-hand notch, or the one nearest the point where the said beam 20 is fulcrumed, the graduations upon the scale-beam 12 register the largest amount of weight for each division, and when the slide is in position over the left-hand notch, or the one farthest from the said fulcrum, the graduations on the scale-beam will register the smallest amount to the division, and the intermediate notch or notches upon the said beam 20 may be arranged for any convenient divisions between the two already described. For example, if the slide is over the right-hand notch on the beam 20, each division on the scale-beam 12 may indicate pounds of weight. If the slide is over the central notch, as shown in Fig. 1 of the drawings, the same notches upon the scale-beam 12 will register quarter-pounds and every fourth notch will indicate the pound weight. If the slide is placed over the left-hand notch, each of the said divisions upon the scale-beam 12 will register ounces, each fourth division will be quarter-pound, and each sixteenth division a pound, and so on.

The graduation on the scale-beam 12 has such a relation with the divisions on the beam 20 as to correctly indicate the weight by the same divisions in either of the positions of the slide, the only difference being that the value of the division increases or decreases as the position of the platform is changed by moving the slide on the beam 20.

The divisions on the beam 12 may be marked in any suitable manner, and in Fig. 5 I have shown the beam provided with several series of marks, the first or finest series of which represents units of weight when the platform is supported at the notch nearest the fixed fulcrum of the beam 12, the second series indicating the same units when the platform is supported at the second notch, and so on.

The details of construction of the scale may be varied without departing from my invention.

This scale is portable and may easily be moved from place to place, and is especially adapted for farm use, where a light portable scale capable of weighing large or small articles is desired.

I claim as my invention—

The combination, in a scale, of the beam 12, provided with the series of graduations, the beam 20, connected with said beam 12, and provided with the notches 48, corresponding to the graduations on the beam 12, and the slide 42, mounted on said beam 20, and supporting a suitable platform, whereby said slide may be arranged over either of said notches, and the weight will be indicated by the corresponding graduation on the beam 12.

In testimony whereof I have hereunto set my hand this 8th day of October, 1887.

MARSHALL B. LLOYD.

In presence of—
JOHN CONMEE,
E. A. TAYLOR.